United States Patent

Solan et al.

[11] Patent Number: 5,850,566
[45] Date of Patent: Dec. 15, 1998

[54] METHOD FOR STORING MULTIPLE FILES WITHOUT HEADER INFORMATION AND FOR EACH STORAGE MEDIUM MAINTAINING A SEPARATE STORED INDEX INCLUDING HEADER INFORMATION FOR EACH FILE

[75] Inventors: Michael Thomas Solan; Daniel James Winarski, both of Tucson, Ariz.

[73] Assignee: International Business Machines Corporation, Armonk, N.Y.

[21] Appl. No.: 571,421

[22] Filed: Dec. 13, 1995

[51] Int. Cl.$^6$ .................................................. G06F 13/00
[52] U.S. Cl. ............................ 395/825; 295/882
[58] Field of Search ................... 360/77.08, 49, 360/36, 44.26; 395/828, 834, 882

[56] References Cited

U.S. PATENT DOCUMENTS

| | | | |
|---|---|---|---|
| 4,827,462 | 5/1989 | Flannagan et al. | 369/49 |
| 5,053,948 | 10/1991 | DeClute et al. | 395/616 |
| 5,123,000 | 6/1992 | Fitzgerald et al. | 369/36 |
| 5,239,650 | 8/1993 | Hartung et al. | 395/828 |
| 5,615,190 | 3/1997 | Best et al. | 369/58 |
| 5,666,337 | 9/1997 | Dang et al. | 369/36 |

FOREIGN PATENT DOCUMENTS 0 522 750 A2  6/1992  European Pat. Off. .

OTHER PUBLICATIONS

Hetzler, Dr. Steven R., "Introducing the No–ID™ Sector Format", (1994), International Business Machines Corporation, San Jose, California.

"IBM 3380 Direct Access Storage Introduction", Third Edition (Sep. 1990), GC26–4491–2, pp. 97–100, International Business Machines Corporation, San Jose, California.

"Maintaining IBM Storage Subsystem Media", Third Edition (Sep. 1990), GC26–4495–02, pp. 73–76, International Business Machines Corporation, San Jose, California.

*Primary Examiner*—Thomas C. Lee
*Assistant Examiner*—Anderson I. Chen
*Attorney, Agent, or Firm*—Baker Maxham Jester & Meador

[57] ABSTRACT

A headerless data storage format is implemented in a library environment. The header information, otherwise stored on the data storage media, is consolidated in one or more indices of the library, thus freeing the media from header information. To export an existing storage medium from the library, the storage medium is modified to include the previously missing header information and then ejected from the library; the medium is thus compatible, as a self-sufficient unit, with other libraries or standalone data storage drives. Conversely, to import a new storage medium containing data and interspersed header information, the medium is received into the library, whereupon the header information is removed from the medium and stored in the appropriate index.

50 Claims, 6 Drawing Sheets

METHOD FOR STORING MULTIPLE FILES WITHOUT HEADER INFORMATION AND FOR EACH STORAGE MEDIUM MAINTAINING A SEPARATE STORED INDEX INCLUDING HEADER INFORMATION FOR EACH FILE

BACKGROUND OF THE INVENTION

1. Field of the Invention

The present invention relates to the storage of data on data storage media using a headerless data storage format. More particularly, the invention concerns the implementation of headerless data storage format for removable data storage media in a library environment.

2. Description of the Related Art

Format Efficiency

Each track of a data storage medium contains user data as well as certain "overhead" information used by storage drives to access and manage the user data. The term "format efficiency" refers to the fraction of each track devoted to storing user data. Accordingly, format efficiency is improved by reducing the overhead. In the format of fixed block architecture ("FBA") disk drives, a number of features contribute to overhead. Some of these, such as synchronization fields, are required for reading the data. Others, such as error correcting codes ("ECC"), cyclical redundancy check ("CRC"), and sector servo, more than make up for their overhead by helping to increase areal density.

However, there is one key contributor to the overhead that does not increase the areal density, and has been a part of track formats since IBM introduced the first disk drive—the "header" or "ID" field.

Header Functions

FIG. 1 illustrates the track layout 100 of a typical FBA disk 101 using sector servo or embedded servo. The track 102 is divided into a number of data sectors and a number of servo sectors. The servo sector 104 contains the positioning information used to locate magnetic heads 106 over the track 102. The user data is stored in the data sectors 108–110. Each data sector includes an associated header field. For example, the data sector 109 includes the header field 112. The header field 112 contains information that identifies the data sector 109, and contains other information, such as flags to indicate defective sectors. The majority of disk drives manufactured today use an addressing scheme where the data sectors are identified to the host system by a logical block number ("LBN"), e.g. as with the SCSI convention.

In operation, the host computer sends a disk drive a list of LBNs to be written or read. The disk drive converts these values into zone, cylinder, head, and sector ("ZCHS") values. The servo system seeks to the desired zone, cylinder, and head, and the disk drive begins reading header fields until a match is found. Once the appropriate header field has been read, the drive may then read or write the associated data field.

Further description of the use and characteristics of headers is found in the following publications, each of which is incorporated herein by reference: (1) IBM 3380 Direct Access Storage Introduction, 3rd Edition (September 1990), pp. 97–100, and (2) Maintaining IBM Storage Subsystem Media, 3rd Edition (September 1990), pp. 73–76.

Impact of Header Fields

The use of header fields allows great flexibility in the format for data storage, and provides a simple mechanism for handling defects. However there are substantial costs associated with the use of header fields. The header fields themselves can occupy up to 10% of a track, space that would otherwise be used to store data. This condition may be worsened with the use of partial response maximum likelihood digital detection channels, which can increase header sizes. Further, since the disk drive must read the header field for each sector prior to a read or write operation, additional space is required for a write-to-read recovery ("w-r") field prior to each header field. An example of a w-r field is the w-r field 114. Such w-r fields can occupy over 5% of a track.

Defect management is typically accomplished by reserving a fixed number of spare sectors at some chosen interval. If a sector is determined to be defective, the data is relocated to one of the spare sectors. The relocation process may shift all the sectors between the defect and the spare, or use a specific spare sector to replace the defective sector, for example. These systems can result in a performance penalty, since some sectors may not be at their expected locations, requiring an additional seek operation. To reduce the likelihood of sector relocation, a large number of sectors are typically reserved as spares, which reduces the format efficiency.

Headerless Sector Formatting Generally

Recently, the IBM Corporation introduced its No-ID™ (hereinafter "headerless") sector format, solving many of the problems discussed above, and dramatically increasing data storage capacity. Broadly, the headerless format works by using memory to centrally store header information associated with a data storage medium, instead of storing the header information on the surface of the medium.

This increases the storage capacity of each track without degrading the track's linear density. When combined with a magnetoresistive ("MR") head, the headerless sector format dramatically increases the track or "pitch" density as well. Further benefits include improvements in data throughput, access time, defect management, and power management.

This technology has been introduced on the DVAx line of 2.5" disk drives made by International Business Machines Corporation, including models providing an industry leading capacity of 810 Mb using 3-disk platters. The theory, implementation, and advantages of the headerless sector format are explained further in the following references: (1) Hetzler, "Introducing the No-ID™ Sector Format", copyright 1994, International Business Machines Corporation, (2) European Patent Application No. 0522750A2, entitled "A Multiple Track Data Storage Disk, a Method of Formatting and a Data Recording Disk File," published on Jan. 13, 1993 in the names of J. S. Best, et al., and (3) U.S. patent application Ser. No. 08/727,680, entitled "Sector Architecture for Fixed Block Disk File," filed on Jun. 23, 1993, in the names of J. S. Best et al. Each of the foregoing documents is incorporated herein by reference.

Headerless Sector Formatting, in Detail

The headerless sector format uses the servo control system to locate physical sectors, and a defect map stored in RAM to identify logical sectors. The disk data controller performs a new operation, converting LBNs to physical block numbers ("PBNs"). FIG. 2 illustrates this operation.

A defect map 200 is stored in RAM, and used to convert LBNs to PBNs. The LBN is a number between zero and the number of addressable blocks on the disk. The PBN is a number between zero and the number of physical blocks on the disk, but with the defective and spare sectors mapped out.

Once the PBN is computed (as shown by 202), it may be converted to the exact ZCHS value for the sector (as shown by 204) using a zone table 206. Since the defect information is known in advance, the proper logical block is guaranteed to be located at the computed ZCHS. The servo system is used to locate the physical sector, based upon knowledge of the track formats in each zone. This information includes the locations of any data field splits due to embedded servo, which are also stored in RAM. The defect map is stored in a compressed format, optimized for small size and rapid lookup.

The headerless sector format enhances disk drive reliability, since the header and data field split information are stored in RAM rather than the disk. Current disk drives rely on CRC or ECC to reduce the vulnerability to errors in the header fields. However, if the drive is unable to read an header field, it may not be possible for it to recover the associated data sector.

MR Heads

While the headerless sector format significantly improves storage capacity for disk drives employing Metal-In-Gap ("MIG") or thin film inductive ("TFI") heads, it provides an even greater advantage with Magnetoresistive ("MR") heads.

MR heads provide higher areal density than MIG or TFI heads. The areal density is achieved through both increased linear density (i.e., bits per inch along a track) and increased track density (i.e., number of tracks per inch). FIG. 3 depicts the basic geometry of an MR head 300, as seen from the disk surface.

The head 300 includes a thin film inductive write element 301 and an MR read element 302. The read element 302 is typically narrower than the write element 301 to improve the off-track performance. In practice, there is an offset between the center of the read and write elements. When used with a rotary actuator, the head 300 is skewed with respect to the tracks as the actuator moves across the disk. The result is a lateral offset between the read and write head centerlines. Optimum performance is achieved by centering the read head 302 over the data track for read operations, and centering the write head 301 over the data track for write operations. This operation will cause the read head 302 to be partially off-track during a write operation.

This offset presents a problem when header fields are present, since they must be accurately read for both read and write operations. FIG. 4 illustrates one known approach to address this problem. The header fields are written partially off-track, at half the write-to-read offset for the given track. In this way, the MR read element 302 can still read the header field during a write operation, when the write element 301 is aligned with the data track.

Although this approach may be sufficient for some applications, track density is limited, since the read head must be able to reliably read the header field. A typical 3.5" disk drive has a maximum head skew angle of about 10°. An MR head with a 3.5 $\mu$m read width, a 4.2 $\mu$m element separation (in the track direction), and a worst case alignment tolerance of 0.5 $\mu$m will require a write width of 4.7 $\mu$m, resulting in maximum track density of roughly 4300 tracks per inch. For some applications, this may constitute an undesirable limitation on track density.

The headerless sector format eliminates this limit on the track density. Since all header and data field split information is stored in RAM, there is no information to be read from the disk relating to the data sector identities or locations. To center the write head on the track during write operations, the servo system need only know the write-to-read element offset. Therefore, the lateral location of the read head is not important during a write operation.

Data Storage Libraries

A number of users have enjoyed the advantages of the headerless sector format through the use of products that completely satisfy their applications. To date, however, the headerless sector format has not been implemented in the data storage library environment. In data storage libraries, there is a need to support the exporting and importing of data storage media of the library. If a data storage medium uses the headerless format, it is incomplete when exported from the library, since the header information is not contained on the medium. Likewise, a new medium imported into the library will not be compatible with the library since it contains header information, unlike the other media in the library. Accordingly, existing data storage libraries are inadequate for those who wish to store data with the new headerless sector format.

SUMMARY OF THE INVENTION

Broadly, the present invention concerns the implementation of a headerless data storage format in a data storage library environment. This is generally accomplished by consolidating the header information, otherwise stored on the data storage media, in one or more remotely located or "centralized" indices. The data storage media are thus freed from header information. To export an existing data storage medium from the library, the medium is modified to include the previously missing header information, and then ejected from the library; the medium is thus compatible, as a self-sufficient unit, with other libraries or standalone data storage drives. Conversely, to import a new data storage medium containing data and interspersed header information, the medium is received into the library, whereupon the header information is removed from the medium and stored in the appropriate library index.

In one embodiment, the invention provides a method for operating a data storage library that supports a plurality of removable data storage media. Each data storage medium may contain one, none, or multiple data files, free in any case from any header information. This contrasts to the normal arrangement, where a data storage medium containing multiple files precedes each file by certain header information. For each data storage medium, an index is maintained separate from that medium, including a list of any data files stored on the medium. The list also includes certain items of header information for each data file. Preferably, the indices are consolidated in a central storage location, such as a random access memory module of the library's controller.

In a different embodiment, the invention provides a data storage library that includes appropriate components to implement the method of headerless data storage format described above.

A data storage system according to this invention affords a number of advantages, such as improvements in the capacity, reliability, and performance of disk drives in the system. In the case of magnetic disk media, the capacity of the disk is improved because, as discussed above, the use of the headerless format increases the track pitch and thereby enables more tracks to be stored on the disk. The data throughput is also increased by reducing the overhead that occurs when header information has to be stored on disk. The invention also enhances power management, since a storage drive does not need to activate on read electronics to read header fields when performing write operations.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

STRUCTURE

Hardware Environment

Figure 1:
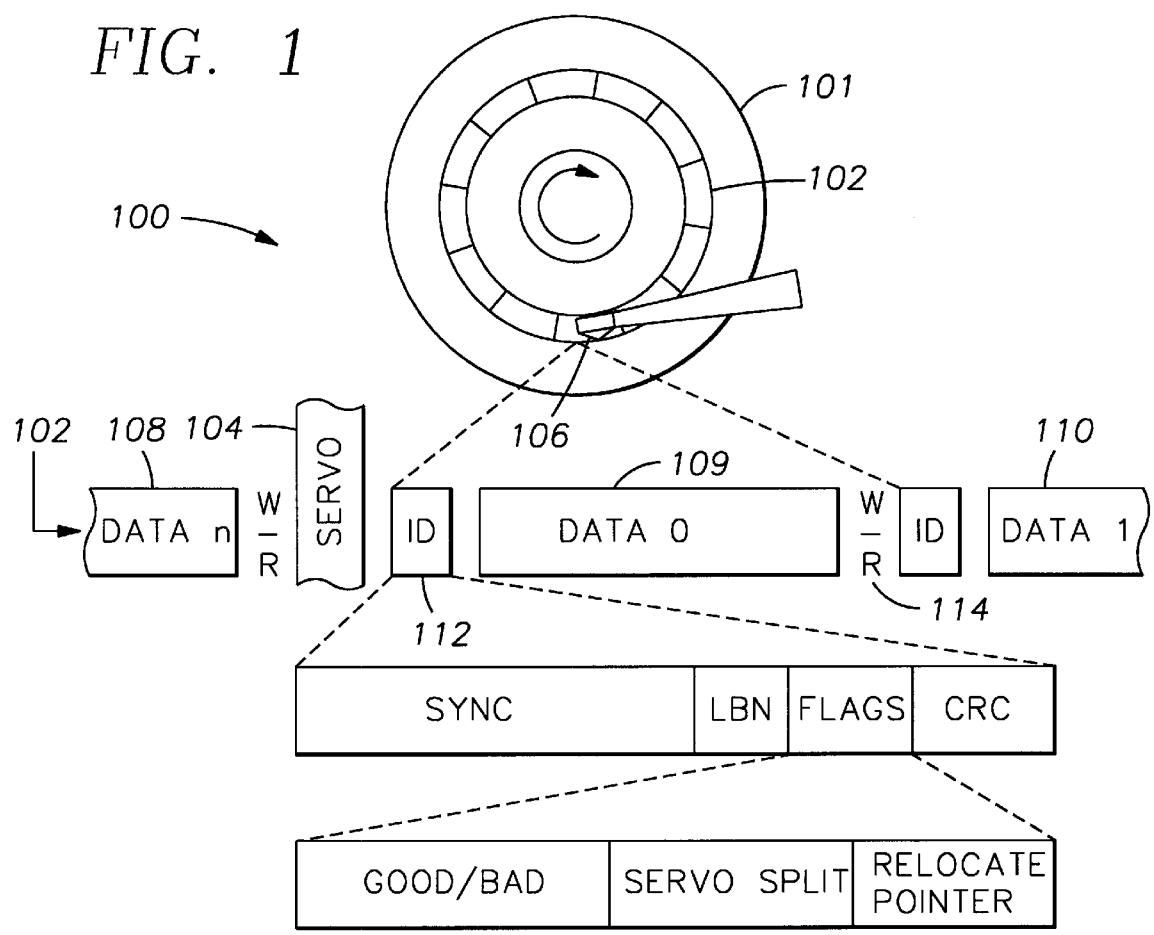
FIG. 1 is a illustrates the track layout of a typical FBA disk drive using sector servo or embedded servo.
Figure 2:
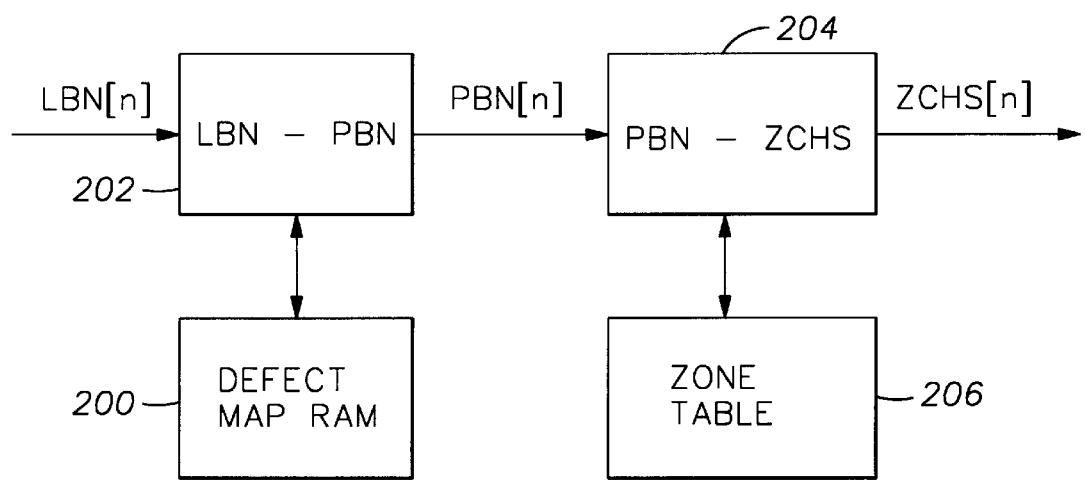
FIG. 2 is a flow diagram illustrating sequence of operation to perform sector identification without disk resident header information.
Figure 3:
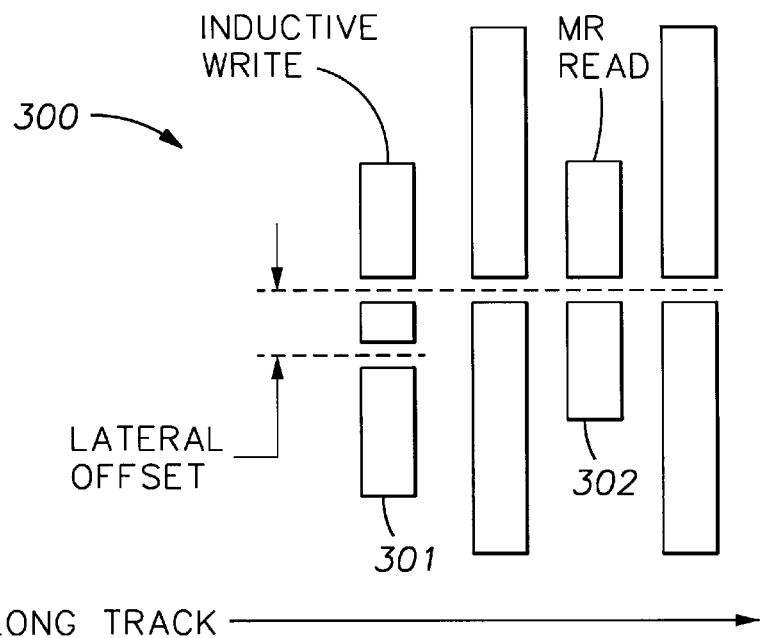
FIG. 3 is a diagram illustrating the geometry of an MR head.
Figure 4:
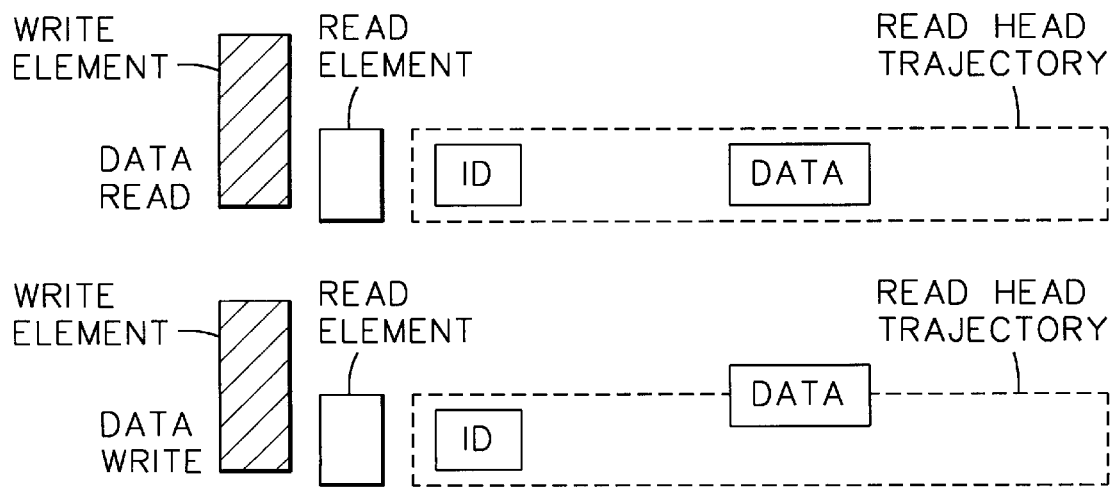
FIG. 4 is a diagram illustrating data read and write operations with offset header fields for an MR head.
Figure 5:
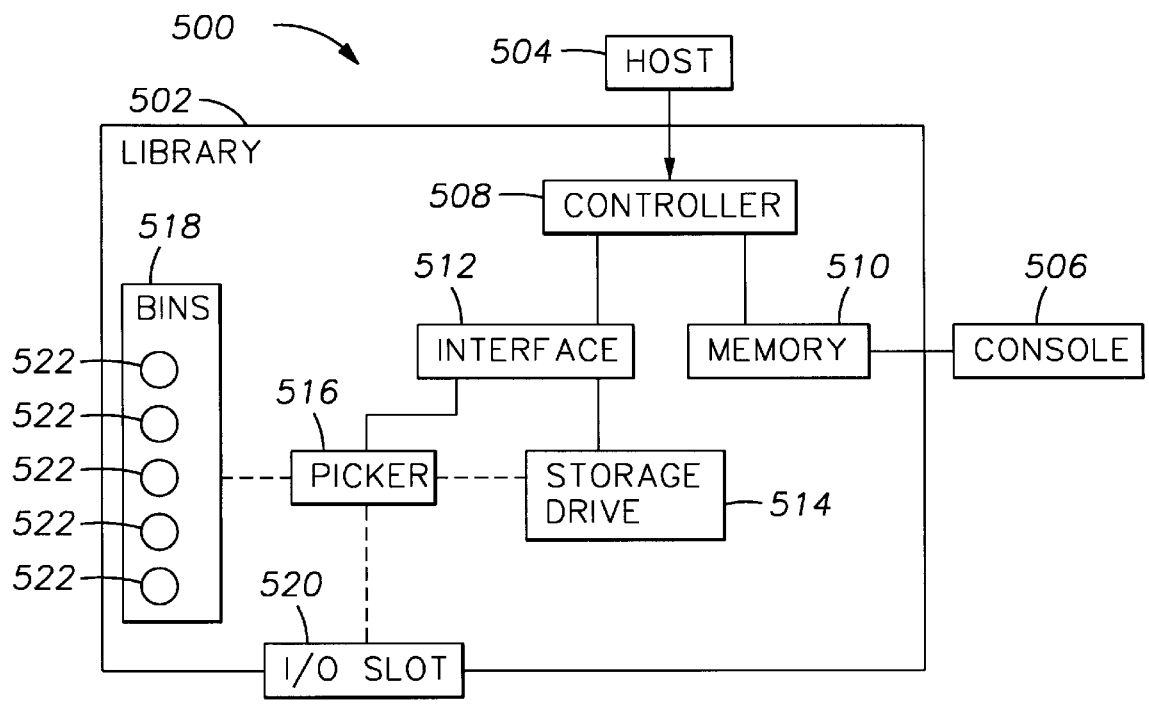
FIG. 5 is a block diagram illustrating the hardware components and interconnections pursuant to one embodiment of the invention.

FIG. 5 depicts the hardware components and interconnections of one exemplary embodiment of the invention. In particular, a data management system 500 is shown, including data storage library 502. The library 500 may comprise, for example, an IBM model 3995 automated storage library. Operation of the IBM 3995 model library is discussed in greater detail in U.S. Pat. No. 5,239,650, issued on Aug. 24, 1993, entitled "Preemptive Demount in an Automated Storage Library", and assigned to International Business Machines Corporation. The '650 patent is incorporated herein by reference in its entirety.

The library 502 exchanges information with a host 504, such as a personal computer, workstation, mainframe computer, a different library, or another entity. The library 502 may additionally employ a console 506, for the purpose of exchanging information with a user.

Figure 6:
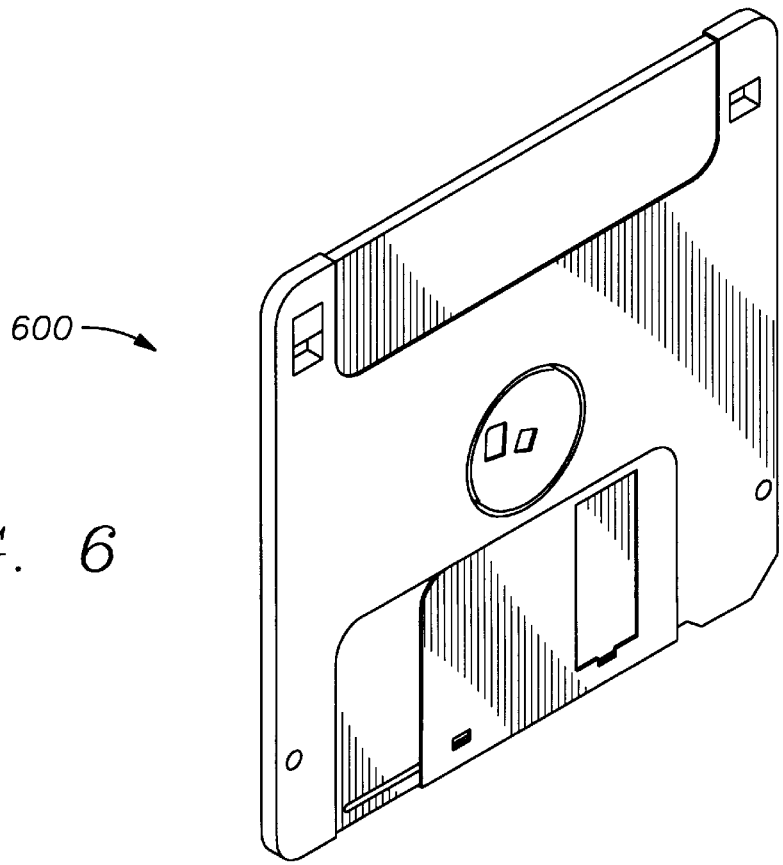
FIG. 6 is a perspective diagram of an illustrative data storage medium pursuant to one embodiment of the invention.

The library 502 includes a controller 508, preferably comprising an INTEL brand i-960™ microprocessor. Alternatively, the controller 508 may comprise another microprocessor, or the controller's functions may be performed by the host 504. A memory 510 is connected to the controller 508. The memory 510, which may be subsumed within the controller 508 if desired, comprises a data storage medium containing machine-readable instructions specifying the operation (described below) of the controller 508. In this respect, the memory 510 preferably comprises RAM, but may comprise another data storage medium such as a removable computer diskette 600 (FIG. 6), selectively coupled to the controller 508. Or, the memory 510 may comprise a DASD array, magnetic tape, conventional "hard drive", electronic read-only memory, optical storage device, paper "punch" cards, or another data storage device. The memory 510 may even comprise one of the data storage media 522 managed by the library 500. In an illustrative embodiment of the invention, the computer-executable instructions contained in the memory 510 may comprise lines of compiled C++ language code.

In addition to the memory 510, the controller 508 is coupled to an interface 512. The interface 512, which may comprise a SCSI interface, supports communications between the controller 508, a storage drive 514, and a media picker 516. In response to commands from the controller 508 received over the interface 512, the media picker 516 transfers data storage media 522 among storage bins 518, the storage drive 514, and an I/O slot 520. The storage media 522 preferably comprise magnetic disk media; other types of storage format may be used additionally or instead, such as linear (contrasted with "helical") magnetic tape, linear optical tape, optical disk, or helical scan tape. For ease of explanation, the invention is illustrated with magnetic disks (herein called "disks") as an exemplary type of storage medium. In this case, the storage drive 514 comprises a disk drive to exchange data signals with one or more of the storage media 522 loaded to the drive 514.

The I/O slot 520 provides a port for exchanging disks 522 between the library 502 and a human user, another library, etc.

Data Storage Format and Architecture

The management of data contained in the disks 522 is an important aspect of the system 500. Data is stored on each disk 522 in a number of data sectors, as described above. To implement the headerless sector format, the storage architecture 700 (FIG. 7) is used. Generally, instead of storing header information on the disks themselves, the information is stored in remotely located indices to make room for more data on the disks. Preferably, index information for all sectors is stored together in the memory 510, although the individual indices may be stored separately in the memory 510 or another location.

Figure 7:
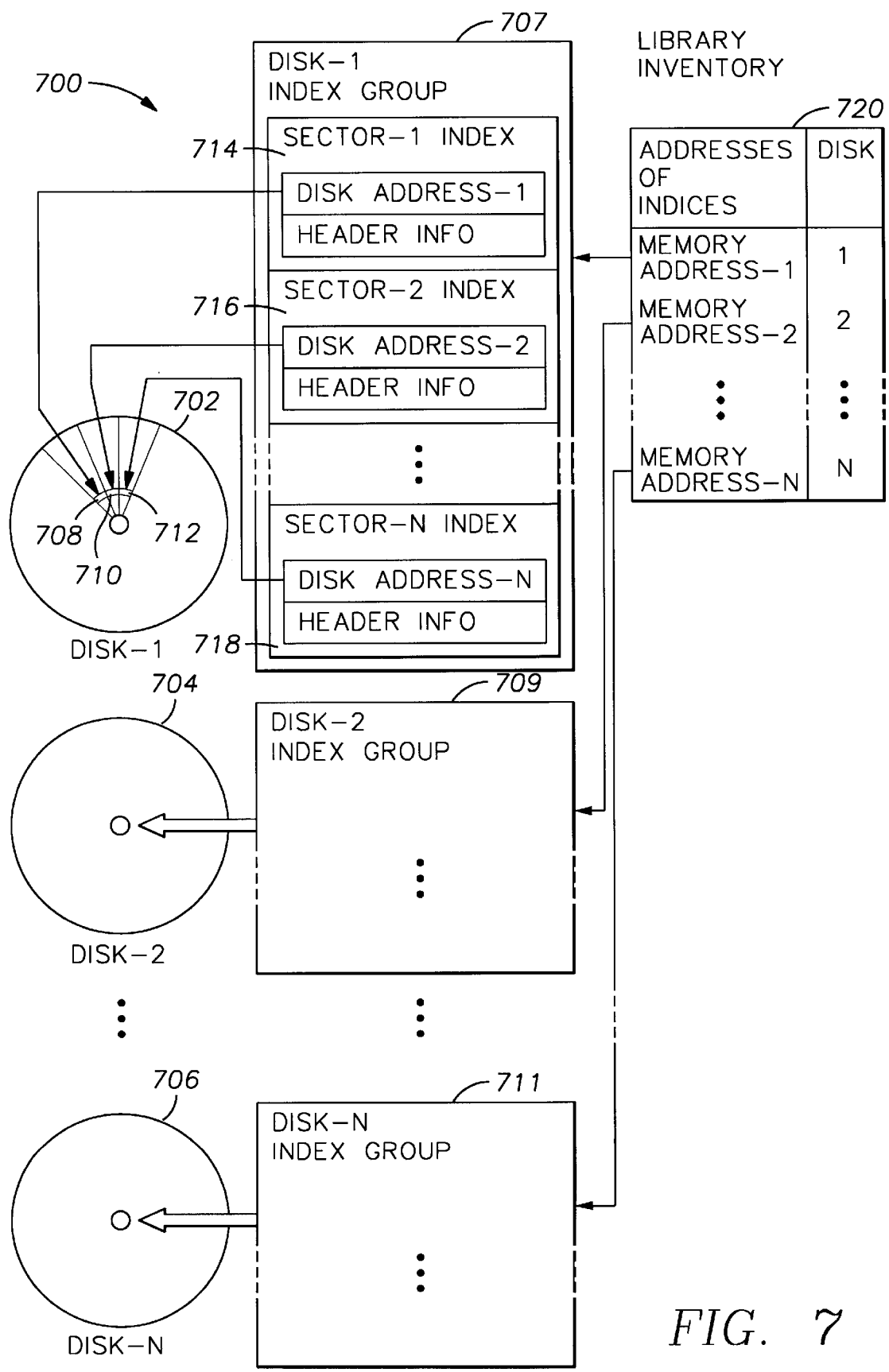
FIG. 7 is a diagram of index and inventory table structure pursuant to one embodiment of the invention.

To illustrate the storage architecture 700 of the invention, FIG. 7 illustrates three disks 702, 704, and 706, which may also be referred to as disk-1, disk-2, and disk-3, respectively. Each disk 702, 704, 706 has a respective index group 707, 709, 711, which includes all of the individual indices for the data sectors contained on that disk.

For example, the index group 707 includes the indices 714, 716, and 718, which correspond to sectors 708, 710, and 712 on the disk 702. As an example, the index 714 specifies the address of the sector 708, and also includes the entirety of header information associated with that sector 708. Thus, the sector 708 employs the headerless sector format. The indices 716 and 718 contain similar information about the sectors 710 and 712. The index group 707 includes other indices (not shown), corresponding to the remaining sectors (not shown) of the disk 702. The content of the index groups 709 and 711 is analogous to the index group 707. In addition, other index groups (not shown) are also provided, corresponding to the remaining disks (not shown) in the library. All index groups, according to one embodiment, may be stored together in the memory 510.

In addition to the indices and their index groups, the architecture 700 may include a library inventory 720. For each disk, the inventory 720 provides the address in memory 510 of that disk's index group. In the case of the disk 702, for example, the inventory 720 points to the index group 707.

OPERATION

In addition to the apparatus aspect of the invention exemplified in the description above, the invention also includes a method for operating a data storage library. For ease of illustration, the operational features of the invention are described below in the context of the library 502. The library 502 generally serves to implement the headerless sector format in the disks 522 of the library 502. Unlike non-library allocations, the library 502 must conduct certain additional operations to support exporting of disks from the library 502 and importing of new disks into the library 502, as discussed below.

General Operation

As mentioned above, the library 502 generally serves to manage the disks 522. This includes a number of tasks not specifically related to the headerless sector format, such as exchanging disks 522 between the bins 518 and the storage drive 514 or the I/O slot 520, loading and unloading disks 522 to/from the storage drive 514, conducting read/write operations to exchange data with the disks 522, and relaying commands and information between the disks 522 and the controller 508 and host 504. Many of these functions may be performed, if desired, using known processes, such as those performed by the IBM model 3995 automated storage library, as discussed in U.S. Pat. No. 5,239,650 identified above.

Pursuant to the invention, the data storage library 502 also performs a number of functions particular to the headerless sector format, as follows.

Data Storage

Importantly, the library 502 stores data on the disks 522 without storing any intervening header information. The manner of storing data on the disks 522 is described more completely above, with reference to FIG. 7. For example, use of the headerless sector format involves the creation and maintenance of various sector indices, e.g. 714.

Import Operations

Figure 8:
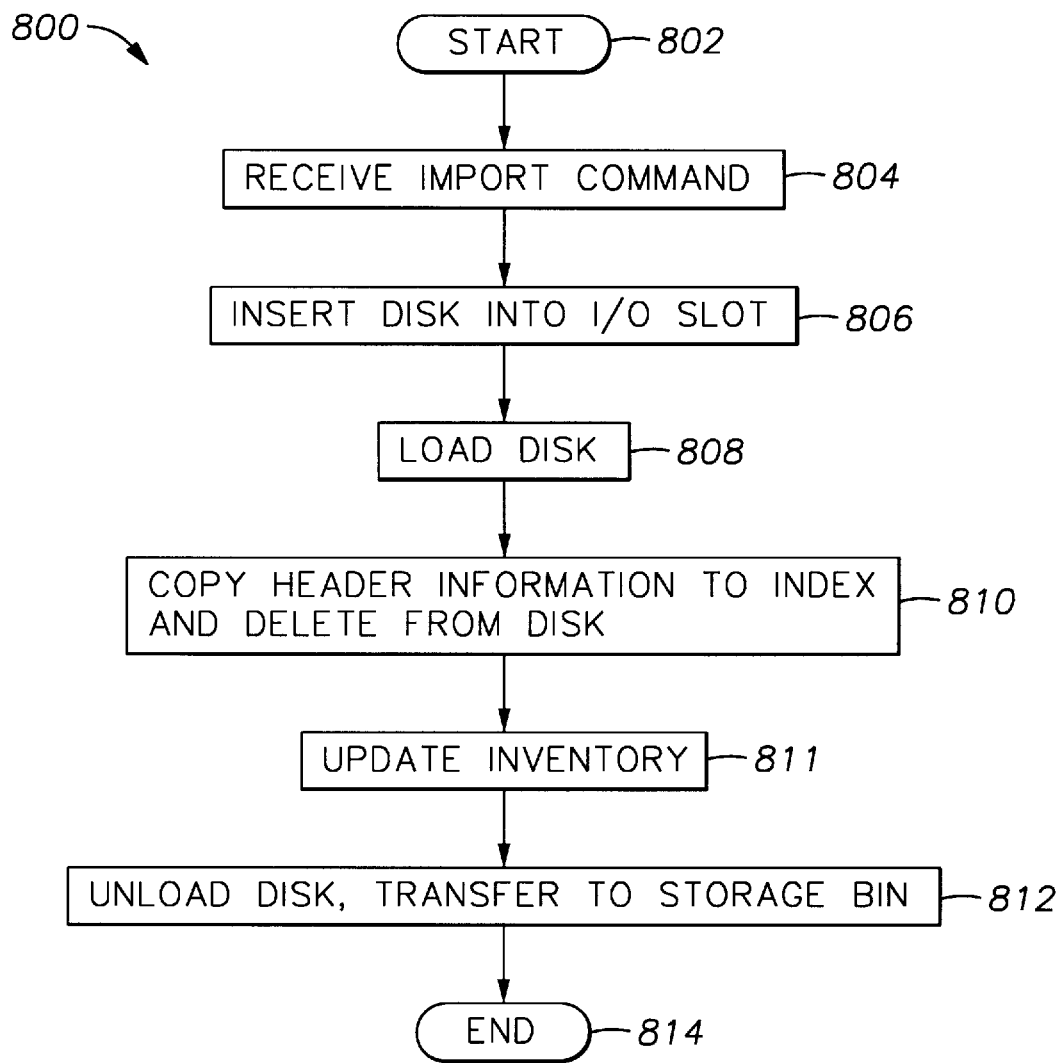
FIG. 8 is a flowchart illustrating an import routine to import data storage media into a library, pursuant to the invention.

One function of the library 502 particular to the headerless sector format is the import operation, an example of which is shown by the sequence 800 of FIG. 8. The import operation generally serves to import disks 522 into the library 502, and then install the appropriate header information on the disks 522. As with the sequence 700 (FIG. 7, above), this sequence 800 may be performed by the controller 508 executing a program of machine-executable instructions stored in the memory 510, as discussed in the following example.

The controller 508 initiates the sequence 800 in task 804 when a request is received to import a disk 522 into the library 502. In this example, the request is made to import the disk from another storage drive or library that does not employ the headerless sector formatting. Such a request may be received from a user via the console 506 or the host 504, from an application program running in the host 504, from another library, or another source.

First, in task 806 the library 502 receives the disk into the I/O slot 520, placed there by a human user, a mechanical disk picker, etc. Then, in task 808 the controller 508 operates the picker 516 to transfer the disk to the storage drive 514, which loads the disk. Following task 808, the controller 508 in task 810 directs the storage drive 514 to copy all header information from each sector of the disk into the memory 510, thereby creating one index corresponding to each sector. After creating the indices for the disk, all header information is deleted from the disk. At this time, the data sectors may be rewritten more closely to each other, creating a large block of contiguous empty space for storing new data.

After task 810, the controller 508 updates the inventory 720 (FIG. 7) in task 811 to reflect addition of the new disk. Then, in task 812 the controller 508 directs the storage drive 514 to unload the disk, and the picker 516 to transfer the newly processed disk to an appropriate storage bin 518. The routine 800 then ends in task 814.

Export Operations

Figure 9:
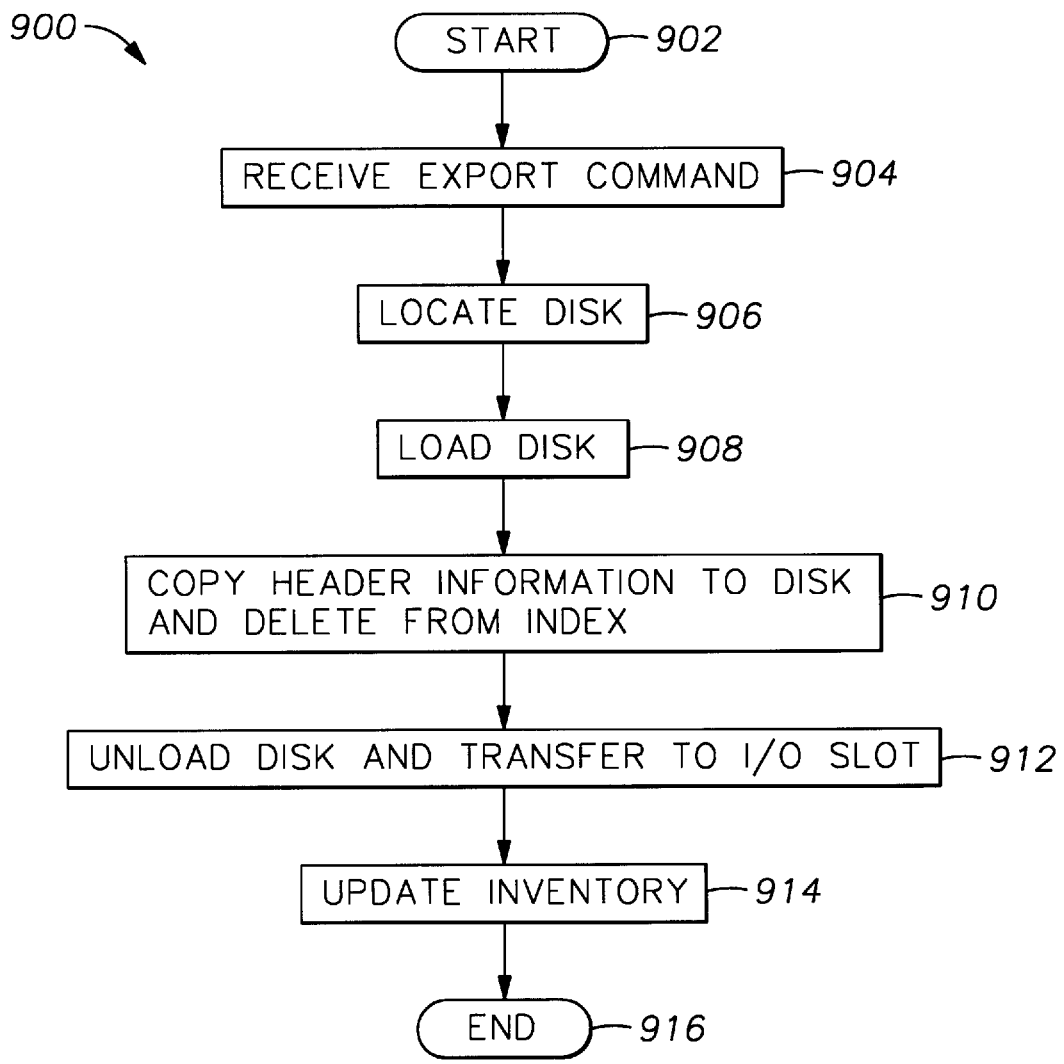
FIG. 9 is a flowchart illustrating an export routine to export data storage media from a library, pursuant to the invention.

Another function of the library 502 particular to the headerless sector format is the export operation, an example of which is shown by the sequence 900 of FIG. 9. The export operation generally serves to export disks 522 from the library 502, after installing header information on the disks 522. This sequence 900 may be performed, as discussed in the following example, by the controller 508 executing a program of machine-executable instructions stored in the memory 510.

The controller 508 initiates the sequence 900 in task 904 when a request is received to export a disk 522 from the library 502. Such a request may be received from a user via the console 506 or the host 504, from an application program running in the host 504, from another library, or another source. First, the controller 508 locates the requested disk in task 906. Task 906 is preferably performed by consulting the inventory 720 (FIG. 7). Having located the requested disk, the controller 508 in task 908 operates the picker 516 to transfer the requested disk to the storage drive 514.

Next, the controller 508 in task 910 operates the storage drive 514 to copy header information corresponding to the sectors of the requested disk from the corresponding indices, and then to delete the associated indices from memory. As discussed above, these indices may be stored in the memory 510, for example. Preferably, task 910 involves re-writing the data sectors so that the header information is interspersed between otherwise adjacent data sectors, making the disk compatible with other libraries or storage drives that do not employ the headerless sector formatting. Alternatively, the controller 508 may simply append the information in free space of the disk so that the receiving library may easily read it.

After task 910, the controller 508 in task 912 directs the storage drive 514 to unload the disk, and the picker 516 to transfer the newly processed disk to the I/O slot 520. At this point in task 912, the disk may be removed from the I/O slot 520 by a human user, a mechanical disk picker, etc. Having exported the disk from the library 502, the controller 508 in task 914 updates the inventory 720 stored in memory 510 to reflect the disk's absence. The routine 900 then ends in task 916.

Data Storage Capacity

With the export routine 900 various measures may be taken to avoid being unable to export a disk with headerless sector formatting because it is too full to receive header information corresponding to its data sectors.

1. Volume Spanning

If the disk capacity is insufficient to receive the header information, one approach is to reallocate the disks' data sectors over multiple disks, storing intervening headers along with the re-distributed data sectors. This technique may be called "volume-spanning", since the contents of what was formerly a single "volume" now spans multiple disks.

2. Reserve Reallocation

Another approach to avoid disk overflow is to reallocate the "reserve space" provided on the disk. Frequently, an amount such as 10% of a disk's storage is held in unformatted reserve to provide a "safety factor" for disk storage. By reallocating and formatting this space, it is made available for data storage.

3. Data Compaction

Another approach involves applying a compression procedure, such as one of many known routines, to compact the data prior to storing the data on the disk. Exemplary compaction routines may perform 2:1 or 10:1 compactions, for example.

4. Other Means

In addition to the exemplary approaches discussed above, many other techniques are available to help export disks that have been tightly packed with data, leaving inadequate space for header information. For example, the controller 508 may regulate data storage on all disks 522 of the library 502 such that each disk always maintains an empty reserve proportional in size to the number of files or images stored on the disk.

A disk's storage capacity is still increased even if the controller 508 provides, for each disk with an empty reserve equal in size to the header information otherwise present on the disk under a header-equipped sector format. As an example, the disk's overall capacity is enlarged due to the greater track pitch provided by headerless formatting, as discussed above.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

For example, the invention may be applied to other embodiments of storage media besides magnetic disk storage, although magnetic disks have been predominately used in the present description to explain and exemplify the invention. Chiefly, the data storage media of the library contemplated by the invention may also include helical scan tape, the operation of which is analogous to magnetic disks, as follows. With magnetic disks, a magnetic transducer head moves relatively slowly to position itself with respect to concentric tracks of a rapidly spinning disk. With helical scan tapes, a magnetic transducer head moves relatively quickly to pass along parallel tracks at an angle to a slowly passing tape.

In addition, the data storage media used with the invention may include other media as well, although certain embodiments may not be able to achieve a reduction in track density, as with magnetic storage media that use MR heads. For example, the invention may be applied to linear (non-helical scan) magnetic tape, optical disks, and optical tape.

What is claimed is:

1. A method for operating a data storage library, said method comprising:

supporting a plurality of data storage media in the library, the media being removable from the library;

storing multiple data files on the media such that the media are free from any header information;

for each data storage medium of the removable data storage media, maintaining a separately stored index that includes a list of data files stored on the individual data storage medium, said list also including header information for each said data file; and exporting a data storage medium of the removable data storage media from the library, said exporting comprising;

receiving a request to export said data storage medium from the library;

for each data file stored on said data storage medium, storing header information on said data storage medium and deleting said header information from the separately stored index maintained for said data storage medium; and ejecting the selected data storage medium from the library.

2. A method for operating a data storage library, said method comprising:

supporting a plurality of data storage media in the library, the media being removable from the library;

storing multiple data files on the media such that the media are free from any header information;

for each data storage medium of the removable data storage media, maintaining a separately stored index that includes a list of data files stored on the individual data storage medium, said list also including header information for each said data file;

importing a new data storage medium into the library, said new data storage medium including multiple data files and, for each data file, certain associated header information, said importing comprising:

receiving a request to import the new data storage medium;

receiving the new data storage medium into the library; and for all data files stored on the new data storage medium, storing the associated items of header information in an index associated with the new data storage medium and deleting said header information from the new data storage medium.

3. The method of claims 1 or 2, further comprising the steps of maintaining a stored inventory including a list of all data storage media supported in the library.

4. The method of claims 1 or 2, further comprising the steps of maintaining a stored inventory including address pointers indicating where indices are stored for each data storage medium.

5. The method of claims 1 or 2, the indices being stored commonly in a random access storage memory circuit of the library.

6. The method of claims 1 or 2, the indices being stored commonly in a hard disk storage unit of the library.

7. The method of claims 1 or 2, the data storage library comprising multiple libraries, each said library containing different ones of the data storage media.

8. The method of claims 1 or 2, wherein the header information for each data file comprises:

storage size of the data file;

a logical block number corresponding to the data file; and an error checking code associated with the data file.

9. The method of claims 1 or 2, the header information including selected data flags.

10. The method of claims 1 or 2, the header information including servo information.

11. The method of claims 1 or 2, the header information for each data storage medium including information identifying addresses of defective storage sectors on said data storage medium.

12. The method of claims 1 or 2, the data storage media comprising removable DASD media.

13. The method of claims 1 or 2, the data storage media comprising removable optical cartridges.

14. The method of claims 1 or 2, the indices being stored in a compacted form.

15. A method for operating a data storage library, said method comprising:

supporting a plurality of data storage media in the library, the media being removable from the library;

storing multiple data files on the media such that the media are free from any header information;

for each data storage medium of the removable data storage media, maintaining a separately stored index that includes a list of data files stored on the individual data storage medium, said list also including header information for each said data file; and exporting a plurality of selected data storage media from the library, said exporting comprising:

receiving a request to export a plurality of data storage media from the library;

for each data storage medium of said plurality, copying header information associated with data files stored on said data storage medium from the separately stored index maintained for said data storage medium to said data storage medium and deleting said header information from said index; and ejecting the plurality of data storage media from the library.

16. A method for operating a data storage library, said method comprising:

supporting a plurality of data storage media in the library, the media being removable from the library;

storing multiple data files on the media such that the media are free from any header information;

for each data storage medium of the removable data storage media, maintaining a separately stored index that includes a list of data files stored on the individual data storage medium, said list also including header information for each said data file;

importing into the library multiple new data storage media representing a volume of data, said new data storage media including multiple data files and associated header information for each file, said importing comprising:

receiving a request to import the new data storage media;

receiving the new data storage media into the library; and for all data files stored on the each new data storage medium, storing the associated items of header information in an index associated with said new data storage medium and deleting said header information from said new data storage medium.

17. The method of claim 16, the receiving and storing steps being performed sequentially for each new data storage medium.

18. The method of claim 16, the receiving and storing steps being performed concurrently for all new data storage media.

19. A data storage medium tangibly embodying a program of machine-readable instructions executable by a computer to perform a method for operating a data storage library, said method comprising:

supporting a plurality of removable data storage media in the library;

storing multiple data files on the media such that the media are free from any header information;

for each data storage medium of the removable data storage media, maintaining a separately stored index that includes a list of data files stored on the individual data storage medium, said list also including header information for each said data file; and exporting a data storage medium of the removable data storage media from the library, said exporting comprising:

receiving a request to export said data storage medium from the library;

for each data file stored on said storage medium, storing header information on said data storage medium and deleting said header information from the separately stored index maintained for said data storage medium; and ejecting the selected data storage medium from the library.

20. A data storage medium tangibly embodying a program of machine-readable instructions executable by a computer to perform a method for operating a data storage library, said method comprising:

supporting a plurality of removable data storage media in the library;

storing multiple data files on the media such that the media are free from any header information;

for each data storage medium of the removable data storage media, maintaining a separately stored index that includes a list of data files stored on the individual data storage medium, said list also including header information for each said data file;

importing a new data storage medium into the library, said new data storage medium including multiple data files and, for each data file, certain associated header information, said importing comprising:

receiving a request to import the new data storage medium;

receiving the new data storage medium into the library; and for all data files stored on the new data storage medium, storing the associated items of header information in an index associated with the new data storage medium and deleting said header information from the new data storage medium.

21. The data storage medium of claims 19 or 20, further comprising the steps of maintaining a stored inventory including a list of all data storage media supported in the library.

22. The data storage medium of claims 19 or 20, further comprising the steps of maintaining a stored inventory including address pointers indicating where indices are stored for each data storage medium.

23. The data storage medium of claims 19 or 20, the indices being stored commonly in a random access storage memory circuit of the library.

24. The data storage medium of claims 19 or 20, the indices being stored commonly in a hard disk storage unit of the library.

25. The data storage medium of claims 19 or 20, the data storage library comprising multiple libraries, each said library containing different ones of the data storage media.

26. The data storage medium of claims 19 or 20, wherein the header information for each data file comprises:

storage size of the data file;

a logical block number corresponding to the data file; and an error checking code associated with the data file.

27. The data storage medium of claims 19 or 20, the header information including selected data flags.

28. The data storage medium of claims 19 or 20, the header information including servo information.

29. The data storage medium of claims 19 or 20, the header information for each data storage medium including information identifying addresses of defective storage sectors on said data storage medium.

30. The data storage medium of claims 19 or 20, the data storage media comprising removable DASD media.

31. The data storage medium of claims 19 or 20, the data storage media comprising removable optical cartridges.

32. The data storage medium of claims 19 or 20, the indices being stored in a compacted form.

33. A data storage medium tangibly embodying a program of machine-readable instructions executable by a computer to perform a method for operating a data storage library, said method comprising:

supporting a plurality of removable data storage media in the library;

storing multiple data files on the media such that the media are free from any header information;

for each data storage medium of the removable data storage media, maintaining a separately stored index that includes a list of data files stored on the individual data storage medium, said list also including header information for each said data file; and exporting a plurality of selected data storage media from the library, said exporting comprising:

receiving a request to export a plurality of data storage media from the library;

for each data storage medium of said plurality, copying header information associated with data files stored on said data storage medium from the separately stored index maintained for said data storage medium to said data storage medium and deleting said header information from said index; and ejecting the plurality of data storage media from the library.

34. A data storage medium tangibly embodying a program of machine-readable instructions executable by a computer to perform a method for operating a data storage library, said method comprising:

supporting a plurality of removable data storage media in the library;

storing multiple data files on the media such that the media are free from any header information;

for each data storage medium of the removable data storage media, maintaining a separately stored index that includes a list of data files stored on the individual data storage medium, said list also including header information for each said data file;

importing a new data storage medium into the library, said new data storage medium including multiple data files and, for each data file, certain associated header information, said importing comprising:

importing into the library multiple new data storage media representing volume of data, said new data storage media including multiple data files and associated header information for each file, said importing comprising:

receiving a request to import the new data storage media;

receiving the new data storage media into the library; and for all data files stored on the each new data storage medium, storing the associated items of header information in an index associated with said new data storage medium and deleting said header information from said new data storage medium.

35. The data storage medium of claim 34, the receiving and storing steps being performed sequentially for each new data storage medium.

36. The data storage medium of claim 34, the receiving and storing steps being performed concurrently for all new data storage media.

37. A data storage library, comprising:

a plurality of data storage media containing multiple data files, the media being free from header information and also being removable from the library;

storage bins to support the plurality of data storage media;

a storage drive to exchange data with a data storage medium mounted to the drive;

a picker to transfer data storage media between the storage drive the storage bins;

a memory containing, for each data storage medium, a corresponding index including a list of any data files stored on said data storage medium, said list also including header information for each data file; and a controller, coupled to the picker, the storage drive, and the memory, the controller being programmed to export data storage media from the library, said exporting including, for each data file stored on each data storage medium being exported, copying corresponding header information from the index to the data storage medium and deleting said header information from the index, the controller also being programmed to import data storage media into the library, said importing including, for each data file stored on each data storage medium being imported, copying all associated items of header information from the data storage medium to an index corresponding to the data storage medium and deleting the copied items of header information from the data storage medium.

38. The data storage library of claim 37, the memory comprising random access memory.

39. The data storage library of claim 37, the memory comprising at least one of the data storage media.

40. The data storage library of claim 37, the data storage media including media of multiple different physical formats.

41. The data storage library of claim 37, the data storage media including optical storage media.

42. The data storage library of claim 37, the data storage media including magnetic storage media.

43. The data storage library of claim 37, the data storage media including optical and magnetic storage media.

44. The data storage library of claim 37, each data file comprising a grouping of multiple data files.

45. The data storage library of claim 37, the data storage media comprising removable DASD media.

46. The data storage library of claim 37, the data storage media comprising removable optical cartridges.

47. The data storage library of claim 37, the controller comprising a microprocessor and a memory circuit.

48. The data storage library of claim 47, the indices residing on the controller's memory circuit.

49. The data storage library of claim 37, the memory residing in a host coupled to the controller.

50. The data storage library of claim 37, further comprising at least one additional storage drive coupled to the controller.

* * * * *